April 30, 1963  D. E. GRISWOLD  3,087,430
DIFFERENTIAL PRESSURE CONTROL SYSTEM FOR CENTRIFUGAL PUMPS
Filed Aug. 12, 1959
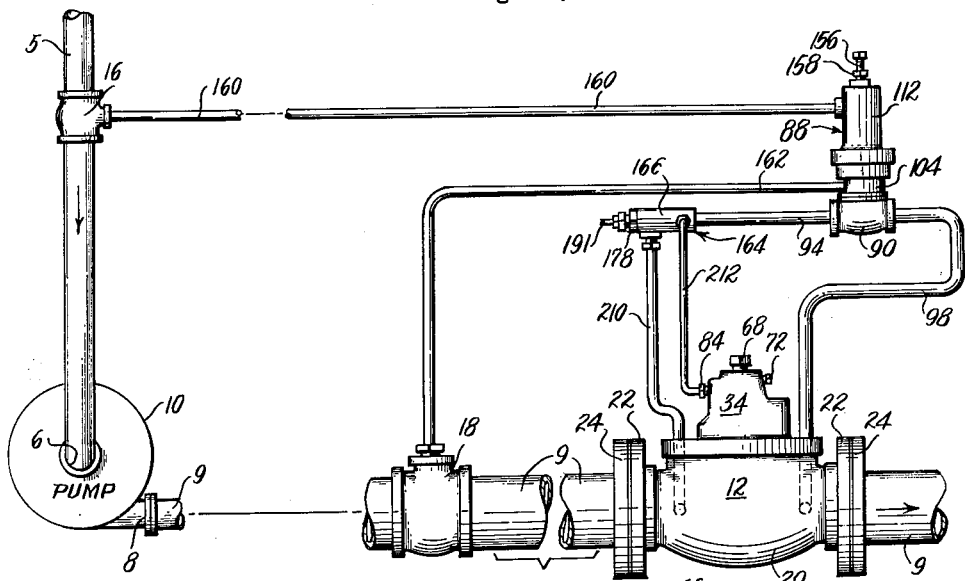
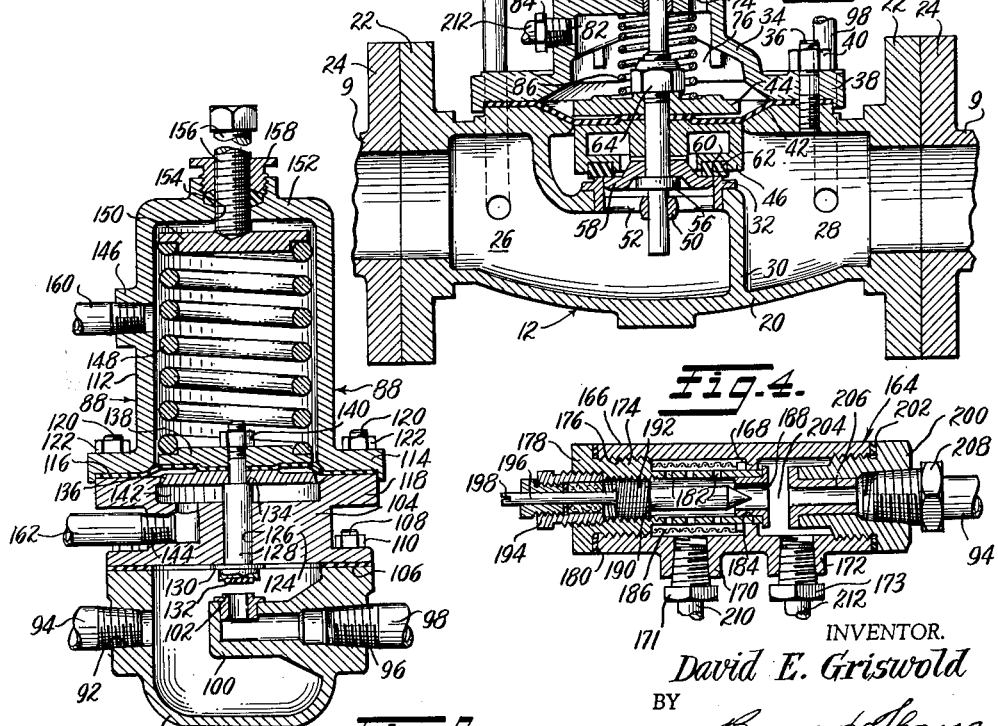
INVENTOR.
David E. Griswold
BY
Bacon & Thomas
ATTORNEYS United States Patent Office 3,087,430
Patented Apr. 30, 1963

3,087,430
DIFFERENTIAL PRESSURE CONTROL SYSTEM FOR CENTRIFUGAL PUMPS
David E. Griswold, Newport Beach, Calif., assignor to Donald G. Griswold, Newport Beach, Calif.
Filed Aug. 12, 1959, Ser. No. 833,309
6 Claims. (Cl. 103—11)

This invention relates to a differential pressure regulating or control system, and more specifically to a system adapted to maintain a constant pressure differential across a centrifugal pump.

While the present control system will be described herein with respect to a centrifugal pump, it is to be understood that it is equally applicable to any dynamic type of pump, such as a screw type pump, a non-positive displacement vane type of pump, etc. Hence, the term "centrifugal pump" as used herein, is to be construed as embracing any dynamic type of pump.

It has been generally customary heretofore, in maintaining a constant pressure differential across a pump, to provide a by-pass connection around the pump, which diverted a portion of the fluid from the discharge side of the pump back to the inlet side. A valve is connected in the by-pass connection and is regulated to by-pass variable quantities of fluid from the outlet side to the inlet side of the pump to maintain a predetermined pressure on the discharge side of the pump, or a predetermined pressure differential across the pump. Other methods involved the regulation of the pump output by adjusting elements in the pump varying the pump capacity or varying the pump speed. In the case of positive displacement type pumps, some system of control, as described, or similar system, must be employed. In the case of dynamic type pumps, such as screw and centrifugal type pumps, it has also been customary to use a by-pass, or to adjust elements within the pump to vary its output.

According to the present invention, the pressure differential across the centrifugal pump is maintained constant by providing a novel control system including a throttle valve on the downstream side of the pump, without regulating the speed of the pump, and without providing additional structure in the pump to vary its capacity. This is possible because the pump can operate at a constant speed while delivering liquid at a desired maximum flow rate, which may be less than the maximum capacity of the pump, due to the particular action of the blades or vanes on the fluid in producing a pumping action.

The principal object of the invention, therefore, is to provide means to regulate the pressure differential across a centrifugal pump and maintain the same constant, without requiring a by-pass, and without varying the speed of the pump, and without providing means to vary the pump capacity.

Another object is to provide a system for regulating the pressure differential across a centrifugal pump, and hence its effective flow rate, by controlling the flow area of the line through which the fluid flows.

A further object is to provide a control system for regulating the pressure differential across a centrifugal pump by varying the effective flow area in the line downstream of the pump.

A still further object is to provide a control system for regulating the pressure differential across a centrifugal pump by varying the effective flow area in the line as a function of the difference between the pump discharge and pump inlet pressures.

Still another object is to provide a control system that will maintain a constant differential pressure across a centrifugal pump regardless of variable upstream pressures and downstream demands.

Still another object is to provide control means for a centrifugal pump that is responsive to the differential pressure across the pump and which will control the pump so that it will provide a desired constant, maximum rate of flow.

Other objects and features of the invention will be apparent from the following description taken in conjunction with the accompanying drawings, in which:

FIG. 1 is a diagrammatic view of the present control system including a pilot valve responsive to the differential pressure of the pump arranged to control a main or flow control regulating valve located on the downstream side of a centrifugal pump;

FIG. 2 is a vertical sectional view through the control valve of FIG. 1;

FIG. 3 is a vertical sectional view through the pressure differential responsive pilot valve of FIG. 1; and FIG. 4 is a vertical sectional view through a combined strainer and needle valve.

Referring to FIG. 1, a fluid supply pipe 5 is shown connected with the inlet 6 of a centrifugal type pump 10 having an outlet 8 to which is connected a discharge pipe 9. A main or flow regulator control valve 12 is connected in the pipe 9 downstream of the pump 10. A differential pressure responsive pilot valve 88 is connected to the flow regulator valve 12 to control the position of a movable member therein as a function of the differential pressure across the pump as will be explained more fully hereinafter. The pump 10 receives fluid under a variable pressure from pipe 5 and delivers the fluid at a regulated increased pressure into the pipe 9, including the flow regulator or main valve 12 downstream of the pump, which regulator is operable to control the rate of fluid flow to maintain a constant pressure differential across the pump 10, as will be described more fully hereinafter.

Referring to FIG. 2, the main valve 12 is hydraulically actuated diaphragm-type valve, which is controlled by the pilot valve 88 in accordance with the pressure differential across the pump 10, as sensed by the pressure taps 16 and 18 upstream and downstream, respectively, of the pump 10. The valve 12 includes a body 20 provided with a pair of end flanges 22 adapted to be connected to adjoining end flanges 24 on the pipe 9. Valve body 20 has a partition 30, which divides its interior into an inlet chamber 26 and an outlet chamber 28. The partition serves as a support for a valve seat 32. A cover 34 is secured to the valve body 20 by a plurality of stud bolts 36 and nuts 40, a flexible, conventional diaphragm 42 being interposed between said valve body and cover and being held in place by the stud bolts, which pass through openings in the rim of the diaphragm.

A diaphragm-supporting plate 46 is disposed in the valve body 20 below the diaphragm 42, and another supporting plate 44 is disposed in the cover 34 above said diaphragm. A valve stem 48 extends through the diaphragm 42 and its supporting plates 44 and 46 and is slidably mounted at its lower end in a guide 50 supported by a spider 52 connected with the valve seat 32. The upper end of the valve stem 48 is guided in a bushing 54 forming a part of the cover 34. The stem 48 has a collar 56 disposed above the guide 50, which serves as an abutment for a disc 58.

The supporting plate 46 has an annular groove 60 formed in the lower face thereof in which a sealing ring 62 is disposed and held in place by the outer marginal portion of the disc 58. The valve stem 48 is threaded in the region of the plate 44, and a self-locking nut 64 is threaded thereon to secure the diaphragm 42, supporting plates 44 and 46, disc 58, and sealing ring 62 in assembled relation. Sealing ring 62 is cooperable with the seat 32 to control the flow of fluid through the main valve 12. The disc 58 is slidable within the valve seat 32 as shown.

The cover 34 has a threaded central opening 66 above the stem 48 which is closed by a conventional pipe plug 68. A threaded opening 70 is formed in a lateral boss 71 on the cover 34 and its outer end is similarly closed by a plug 72. An upright passage 74 establishes communication between the opening 66 and a pressure chamber 76 formed within the cover 34 above the diaphragm 42, so that the upper end of the valve stem 48 is subject to the pressure in the chamber 76. Another lateral boss 80 has a threaded opening 82 in which a conventional fitting 84 is mounted. A compression spring 86 is disposed in the chamber 76 between the cover 34 and the plate 44, and constantly tends to urge the valve stem 48 downward to its valve closing position against the line pressure in the inlet chamber 26. In the event of failure of pressure in the pipe line 9, the spring 86 will automatically close the main valve 12.

Referring to FIG. 3, the differential pressure responsive pilot valve 88 comprises a body 90 having a threaded inlet passage 92, adapted to receive one end of a conduit or control line 94. The body 90 also has a threaded outlet passage 96 adapted to receive one end of a conduit 98. A partition 100 extends from the outlet opening 96, and has a valve seat 102 mounted thereon. An intermediate section 104 is adapted to fit on the upper open end of the housing 90, being separated therefrom by an annular gasket 106. The body 90 and intermediate section 104 are maintained in a fluid-tight relation by a plurality of stud bolts 108 and nuts 110.

A cover 112 has a flange 114 at its lower end resting upon a diaphragm 116 interposed between said flange 114 and a flange 118 on the upper surface of the intermediate section 104. A plurality of stud bolts 120 pass through aligned openings in the flange 114 and the diaphragm 116 and receive nuts 122 to hold the parts in fluid-tight relation.

The intermediate section 104 has a transverse wall 124 provided with a central opening or bore 126 to slidably receive a valve stem 128. The lower end of the valve stem 128 has a collar 130, which is adapted to engage the lower surface of the transverse wall 124 to limit the upper movement of the valve stem. The lower end of the valve stem 128 is recessed to receive a valve disc 132, cooperable with the valve seat 102, to control the flow of fluid between the inlet passage 92 and the outlet passage 96 of the pilot valve.

The upper end of the valve stem 128 has a shoulder 134 disposed above the transverse wall 124 and adapted to form an abutment for a diaphragm-supporting plate 136 on the lower side of the diaphragm 116. Another diaphragm plate 138 is mounted on the valve stem 128 above the diaphragm 116, and a nut 140 is mounted upon the upper threaded end of the valve stem 128 to maintain the diaphragm-supporting plates 136 and 138 and the diaphragm 116 in assembled relation on the valve stem 128. The upper surface of the intermediate section 124 is recessed to provide a pressure chamber 142 at the lower side of the diaphragm 116, and a radial passageway 144 is formed in said transverse wall to communicate with said pressure chamber 142. The cover 112 has a threaded boss 146 for a purpose to be described hereinafter. A compression spring 148 is disposed within the cover and its lower end is engaged with the upper diaphragm-supporting plate 138, and its upper end is engaged with a spring plate 150. The cover has an upper end wall 152 provided with a threaded opening 154 in which an adjusting screw 156 is mounted. The adjusting screw passes through a packing gland 158 in the upper wall of the housing to prevent the leakage of fluid. A conduit 160 connects the threaded boss 146 with the pressure tap 16, whereby the upper surface of the diaphragm 116 is subject to the variable pressure of the fluid in the supply pipe 5 on the inlet side of pump 10. Another conduit 162 connects the radial passageway 144 with the pressure tap 18 in the discharge pipe 9, whereby the lower surface of the diaphragm 116 is subject to the pressure downstream of the pump 10 and upstream of the main valve 12. A combined strainer and choked flow restrictor or needle valve 164 is provided in the control line 94 leading to the pilot valve 88, as shown in FIG. 1.

Referring to FIG. 4, the combined strainer and needle valve 164 comprises an elongated tubular housing 166 having a transverse partition 168 intermediate the ends thereof. On opposite sides of said partition the tubular housing 166 is provided with a pair of spaced threaded bosses 170 and 172, which are adapted to receive conventional pipe fittings 171 and 173. An elongated strainer sleeve 174 is adapted to be inserted into the housing 166, in spaced relation thereto, said sleeve carrying external threads at one end thereof to engage internal threads 176 in one end of the housing. The sleeve 174 has an external flange 178 to limit the movement thereof into the tubular housing 166 and to engage a gasket 180 positioned between the flange 178 and the end of the housing 166 to provide a fluid-tight seal. Strainer sleeve 174 is provided with a plurality of perforations 182, permitting fluid to pass from the exterior to the interior thereof. The partition 168 has a central bore 184 forming a tight fit with the end of the strainer sleeve 174.

A foraminous screen 186 surrounds the perforations 182 in the strainer sleeve 174 to prevent the entry of foreign matter into the control line 94. The inner end of the strainer sleeve 174 carries a choke or restriction 188, which cooperates with a needle valve 190 to provide a restricted or choked flow of fluid into the control line 94. Needle valve 190 has a threaded stem 192, which cooperates with internal threads in the strainer sleeve 174 to permit endwise movement relative to the restriction 188. The outer end of the needle valve 190 includes an extension 196, which passes through a packing gland 194 in the outer end of the strainer sleeve 174 to prevent the loss of fluid therefrom. The outer end of the extension 196 is provided with a transverse slot 198 adapted to receive a tool, such as a screw driver, to permit the adjustment of the clearance between the end of the needle valve 190 and the restriction 188.

The opposite end of the tubular housing 166 is closed by a closure member 200, which carries a flange engaging a gasket 202 to prevent leakage of fluid. The inner end of the closure 200 is spaced from the choke or restriction 188 to provide a chamber 204 communicating with the pipe fitting 173. The closure 200 carries an orifice tube 206 which communicates with a fitting 208 and control line 94. The fitting 171 is connected with one end of a conduit 210, the other end of which opens into the inlet chamber 26. The pipe fitting 173 is connected with one end of a conduit 212, the other end of which is connected to the pressure chamber 76 of the main valve 12 by way of the pipe fitting 84.

From the foregoing description, it will be apparent that the conduit 210 and the combined strainer and needle valve 164, deliver a constant rate of flow of liquid to the control line 94, and that the pilot valve 88 regulates the pressure in said control line by continually bleeding liquid therefrom at varying rates through the discharge conduit 98 into outlet chamber 28. Variation of the control pressure in the control line 94 is used to control the pressure within the pressure chamber 76, and thereby the position of the movable member of the main valve 12. As is shown in FIGS. 1, 2 and 3, one end of the conduit 98 is connected to the threaded passageway 96 of the pilot valve 88, and the other end discharges into the outlet chamber of the main valve.

The operation is as follows: The conduit 160, communicating with the pressure tap 16 upstream of the pump 10, conducts the variable inlet pump pressure to the chamber within the housing 112 on the upper surface of the diaphragm 116. This pressure, aided by the compressive force of spring 148, tends to urge the diaphragm 116 and the valve stem 128 in a downward direction, to bring the valve disc 132 in closing relation to the valve seat 102. The pipe connection 162, communicating with the pressure tap 18 between the pump outlet 8 and the main valve 12, transmits the pressure of the fluid to the pressure chamber 142 and acts on the lower surface of the diaphragm 116 in opposition to the downward pressure of the fluid communicated by conduit 160 and the spring 148, producing an upward force tending to move the valve stem 128 and the valve disc 132 away from the valve seat 102. As the pressure areas on the upper and lower surfaces of the diaphragm 116 are substantially the same, it is obvious that the forces are in equilibrium when the pressure of the liquid at the tap 16 combined with the spring force 148 is equal to the pressure at the tap 18. The compressive force of the spring 148, therefore, determines the pressure difference to be maintained across the pump 10, and this pressure difference can be varied by adjustment of the screw 156.

Assuming that the parts are in equilibrium with the pilot valve 88 in the position shown in FIG. 3, and that an increase in pressure occurs in the pipe 5 upstream of the pump 10, such increase in pressure will effect the pressure differential across the pump, producing an increase in pressure above the diaphragm 116 and a movement of the valve stem 128 and valve disc 132 toward the closing position with reference to the valve seat 102. The needle valve 190 and the flow restrictor 188 are designed to give a constant rate of fluid flow into the control line 94 upstream of the pilot valve 88. As the pilot valve is moved toward its closed position as the result of an increase in pressure in the pipe 5, the bleed of fluid from the control line 94 is restricted, resulting in an increase in pressure in the control line 94, chamber 204 in the combined strainer and needle valve assembly 164, in the conduit 212, and consequently also in the pressure chamber 76 of the main valve 12. This action produces a downward movement of the movable valve members 46, 62 of the main valve 12, and a reduced flow of fluid through said valve. This causes an increase in the back pressure on the pump 10, which is effective to increase the discharge pressure in the pipe 9 until the pressure difference for which the spring 148 is loaded is again attained. The same operation takes place in the event of an increased demand on the pipe line 9, resulting in a decreased pressure on the discharge side of the pump 10. The main valve 12 then functions as a flow regulator to control the pressure rise across the pump 10, and its design is such as to always permit sufficient fluid flow to meet any variable demand downstream of said main valve 12, and will fully close only in the event of failure of the fluid supply upstream of the valve.

Assuming a decrease in pressure in the pipe 5, the differential pressure across the pump 10 will increase, and the reduced pressure on the upper surface of the diaphragm 116 will result in an upward movement of the valve steam 128 and the opening of the pilot valve 88. Such opening of the pilot valve 88 will permit a greater rate of flow therethrough and thus reduce the fluid pressure in the control line 94 and in the pressure chamber 76 of the main valve 12, which will result in an opening movement of the movable element of the main valve 12, and a reduction in the pressure downstream of the pump 10, until the desired pressure differential is restored.

In view of the fact that the discharge flow from a dynamic type of pump is definitely related to the differential pressure across the pump, it is evident that the flow rate in the system is effectively controlled. The throttling of the fluid flow by the flow control valve 12, assuming that the pump speed remains unchanged, produces an increased back pressure on the discharge side of the pump 10, and results in a slipping action between the impeller and the fluid in the pump housing.

Normally, the present pump control will maintain a predetermined constant pressure differential across the pump 10, regardless of variations in suction head pressure in the pipe 5 upstream of said pump and variations in demand on the pipe 9 downstream of said pump. In this way, a desired maximum uniform flow rate through the pump may be maintained within the capacity of the pump, regardless of fluctuations in suction head pressures.

The present system finds particular application in situations wherein there is an available supply of fluid at a variable pressure, and wherein it is desired to satisfy a variable demand at a higher pressure, and wherein a given maximum flow rate is to be maintained.

The invention is not limited to controlling the differential pressure across a centrifugal pump, but can be used to maintain a constant pressure differential between any two pressure points in a system where the closing of the main valve directly causes the differential pressure to increase.

It is to be understood that various changes may be made in the details of construction and in the arrangement of the parts of the flow control system disclosed herein without departing from the principles of the present invention or from the scope of the annexed claims.

I claim:
1. A control system for maintaining a constant pressure differential across a centrifugal pump, comprising: a pipe system to which a fluid may be supplied at a variable pressure and from which fluid may be drawn at a variable rate, a centrifugal type pump, having an inlet and an outlet, connected with said pipe system; and means to maintain a constant pressure differential across said pump, said means including a flow regulating main valve operable between closed and fully opened positions connected in said system downstream of said pump and arranged so that the discharge pressure of said pump tends to open said valve, and means responsive to the pressure differential across said pump controlling the operation of said main valve.

2. A control system according to claim 1, in which the means to maintain a constant pressure differential across the pump includes a housing having a flexible diaphragm, and pressure chambers on opposite sides of said diaphragm, a pressure tap upstream of said pump and a pressure tap downstream of said pump but upstream of said main valve, each connected to one of said pressure chambers.

3. A control system according to claim 1, in which the means to maintain a constant pressure across the pump includes a pressure chamber, movable means, responsive to the pressure in said pressure chamber, connected to a movable member of said flow regulating valve, a control line, means to continuously supply a fluid under pressure to said control line, means to bleed fluid from said control line at a variable rate, a flexible diaphragm connected to said last-mentioned means, fluid connections between the inlet and outlet of said pump and opposite sides of said diaphragm, and a fluid connection between said control line and said pressure chamber.

4. A control system according to claim 3, in which the means to continuously supply a fluid under pressure to said control line includes a choked-flow connection in said pipe system between the pump and the flow regulating valve, and a connection from said bleed means to said system downstream of said flow regulating valve.

5. A control system according to claim 3, in which the choked-flow connection includes a restriction and an adjustable needle valve cooperating with said restriction.

6. A control system for maintaining a constant pressure differential across a centrifugal pump, comprising: a pipe line; a centrifugal pump connected in said pipe line; a fluid pressure-responsive flow controlling main valve connected in said pipe line on the downstream side of said pump and arranged so that the discharge pressure of said pump tends to open said valve; and a differential pressure responsive pilot valve connected with said main valve controlling the supply of operating fluid to and the exhaust of operating fluid from said main valve; a diaphragm connected with said pilot valve, said pilot valve having a chamber on each side of said diaphragm; and means connecting the chamber at one side of said diaphragm with a pressure tap in said pipe line upstream of said pump, and means connecting the chamber at the other side of said diaphragm with a pressure tap in said pipe line downstream of said pump, but upstream of said main valve.

References Cited in the file of this patent

UNITED STATES PATENTS

| | | |
|---|---|---|
| 1,305,365 | Hopkins | June 3, 1919 |
| 1,714,925 | Sandberg | May 28, 1929 |
| 2,049,233 | Thomas | July 28, 1936 |
| 2,409,837 | Alford | Oct. 22, 1946 |
| 2,527,728 | Hoefer | Oct. 31, 1950 |
| 2,786,420 | Kenney | Mar. 26, 1957 |
| 2,938,536 | Ehrenberg | May 31, 1960 |
| 2,950,682 | Kimmel | Aug. 30, 1960 |

FOREIGN PATENTS

| | | |
|---|---|---|
| 894,481 | Germany | Oct. 26, 1953 |